J. A. SANFORD.
BOTTLE MACHINE.
APPLICATION FILED OCT. 10, 1910.
1,019,533.
Patented Mar. 5, 1912.
7 SHEETS—SHEET 1.
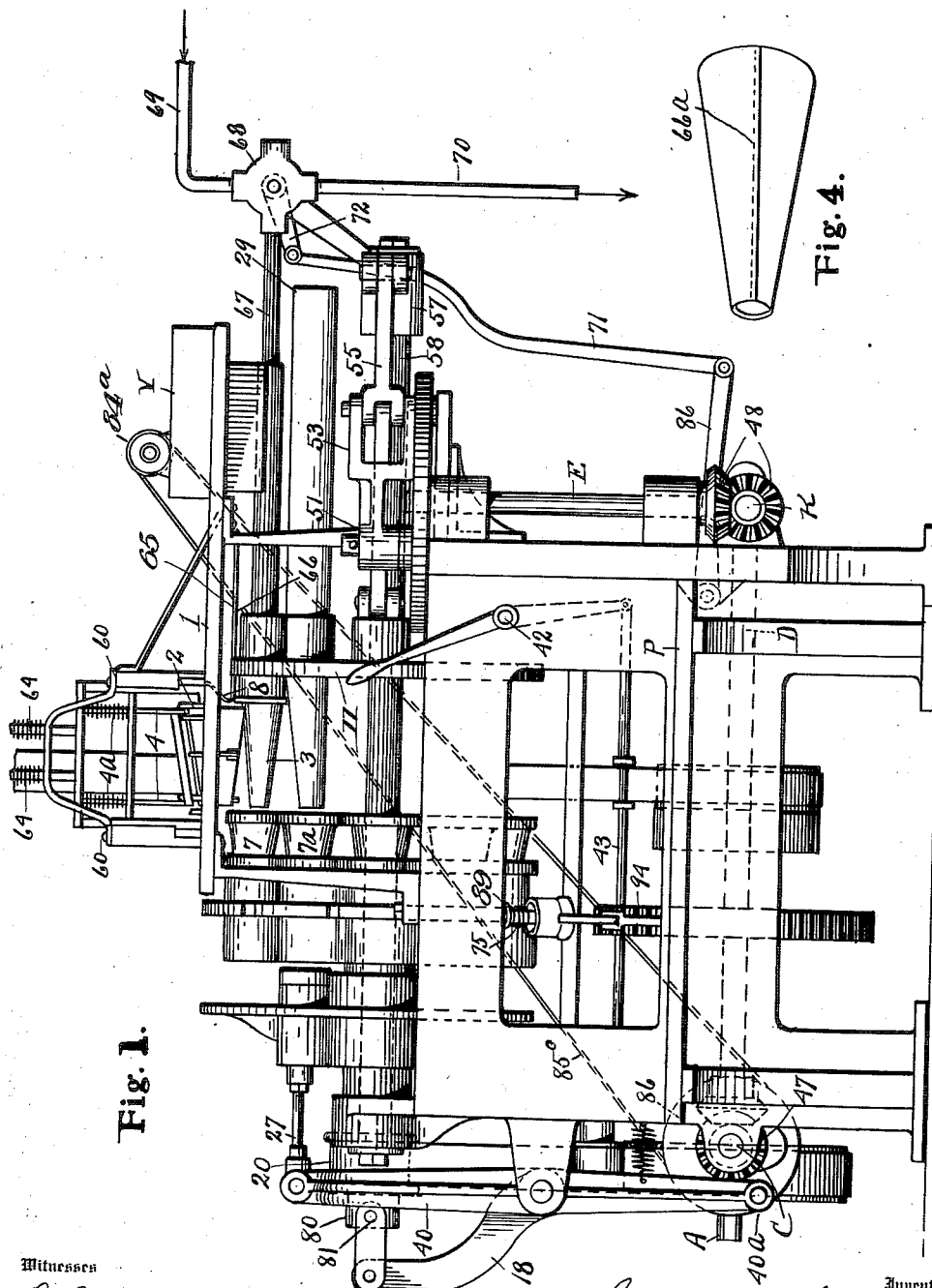

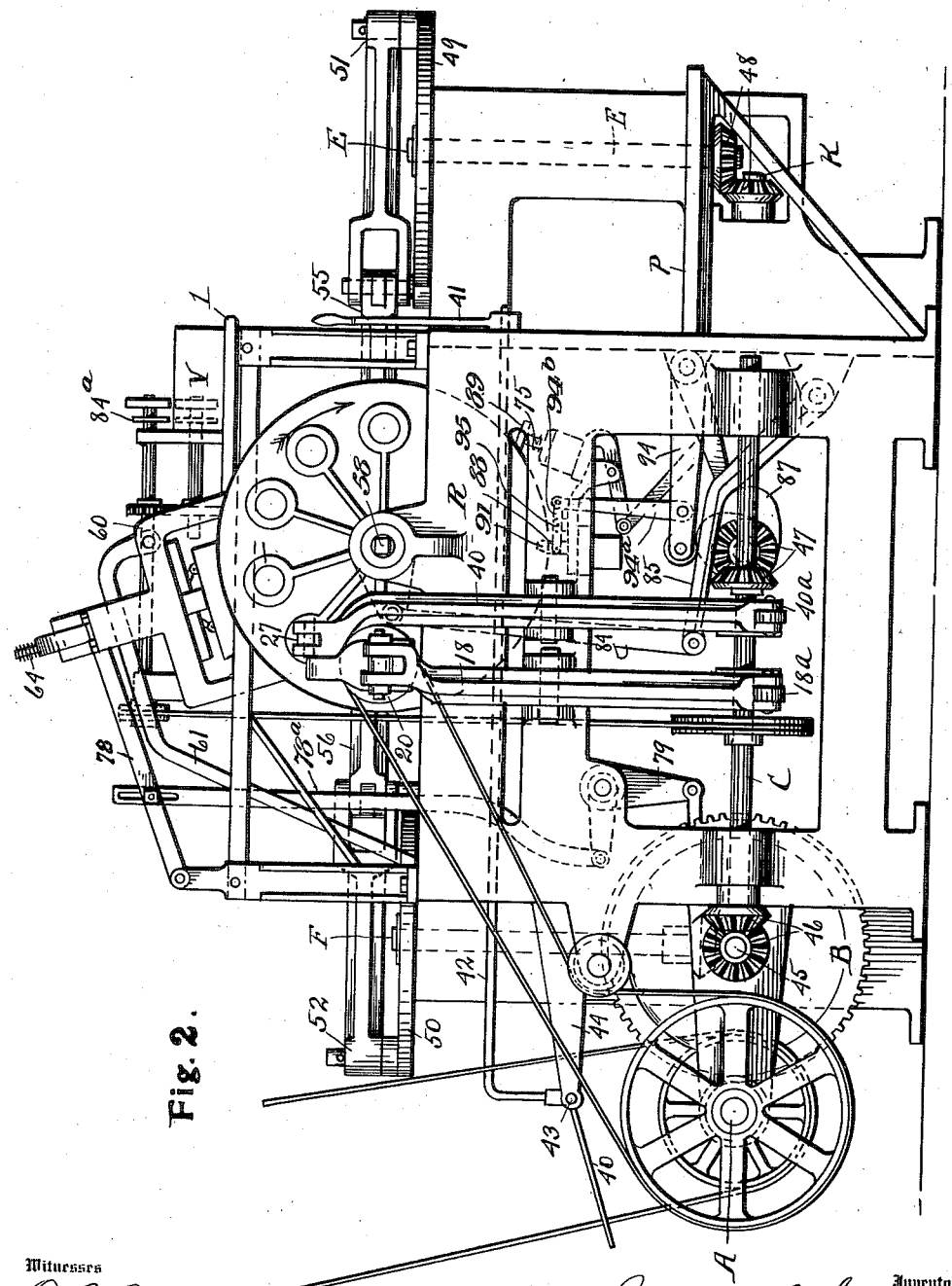

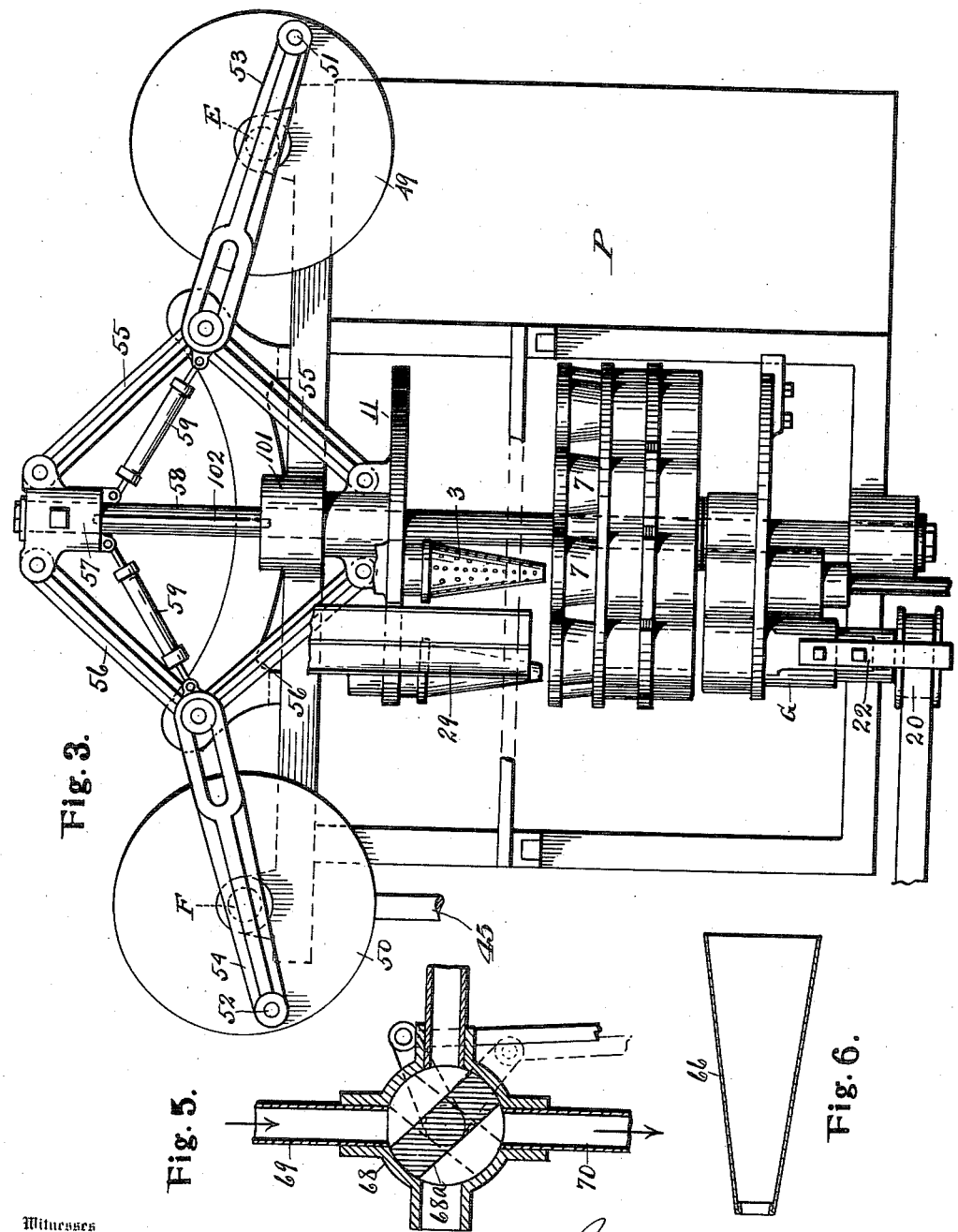

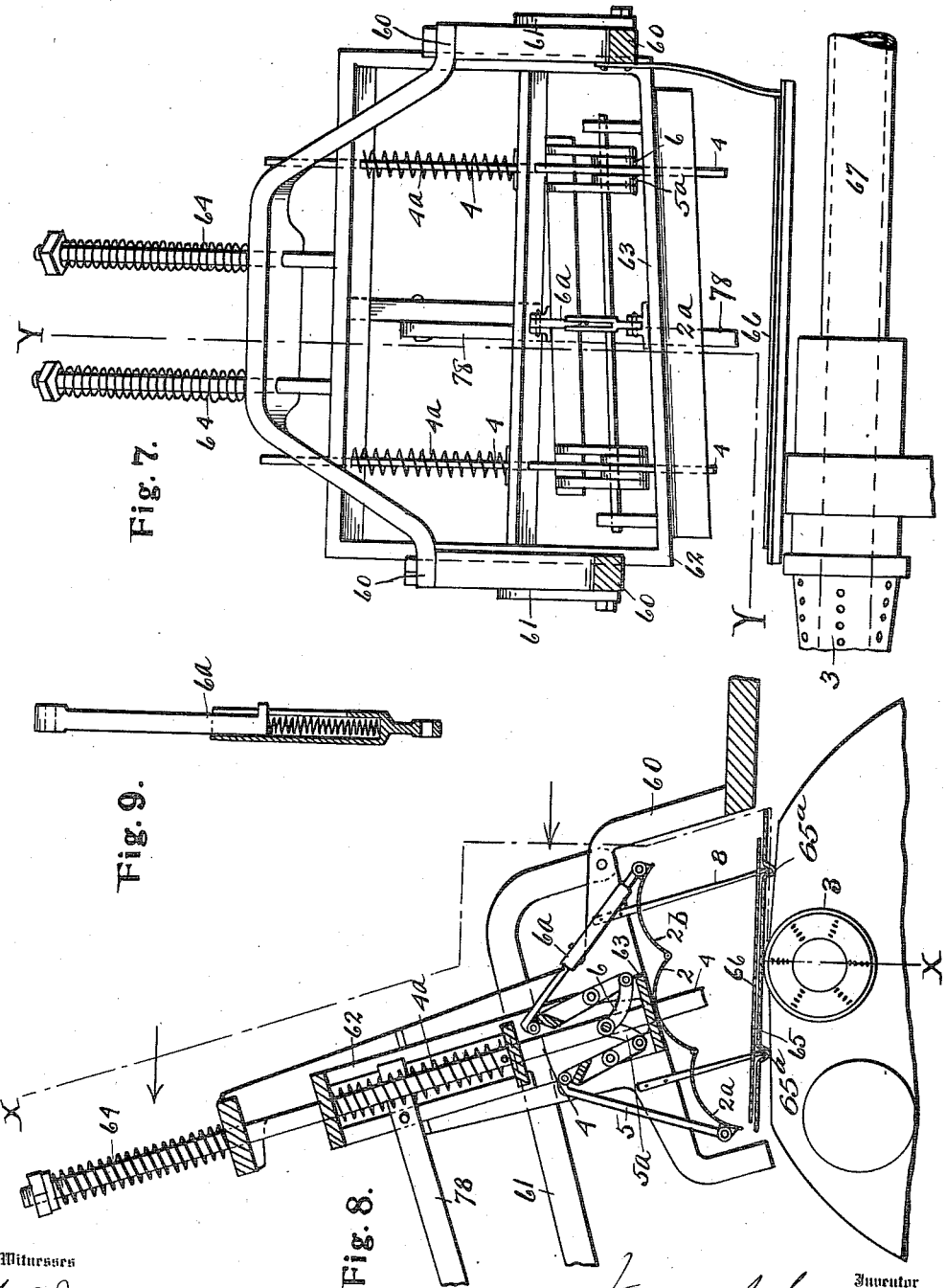

J. A. SANFORD.
BOTTLE MACHINE.
APPLICATION FILED OCT. 10, 1910.
1,019,533.
Patented Mar. 5, 1912.
7 SHEETS—SHEET 5.
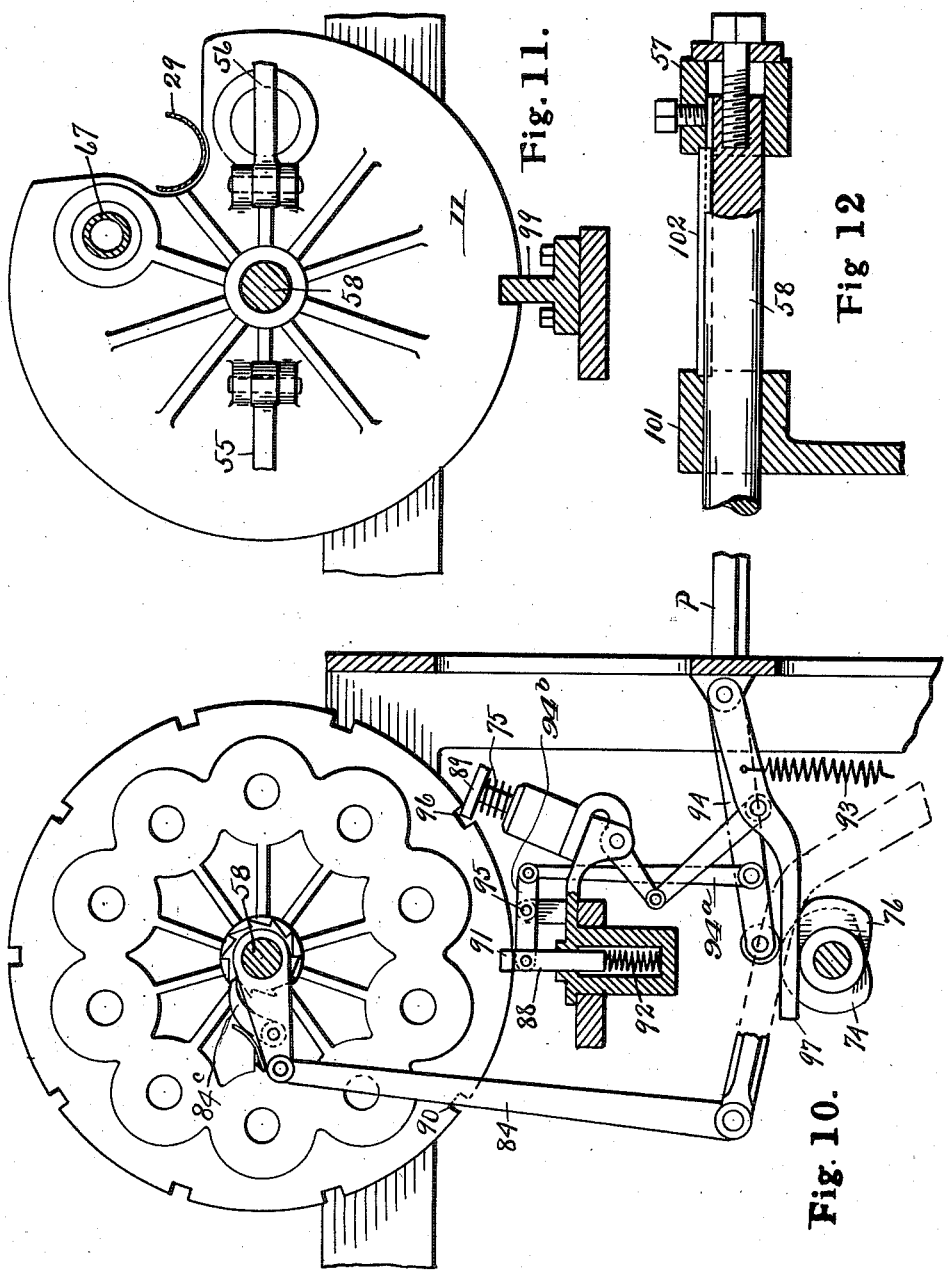

J. A. SANFORD.
BOTTLE MACHINE.
APPLICATION FILED OCT. 10, 1910.
1,019,533.
Patented Mar. 5, 1912.
7 SHEETS—SHEET 6.
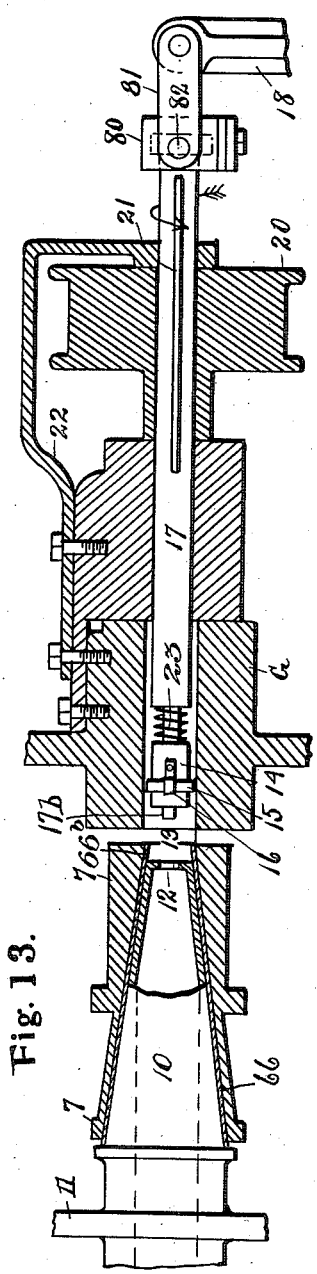
Fig. 13.
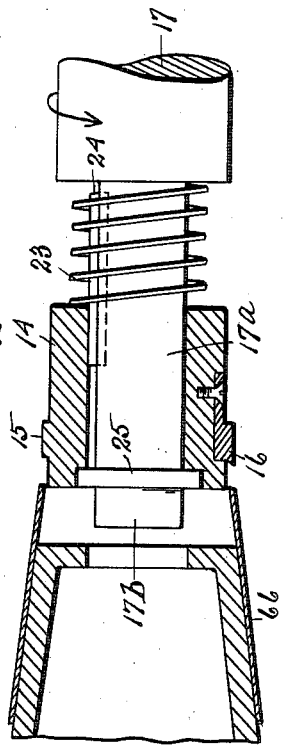
Fig. 14.
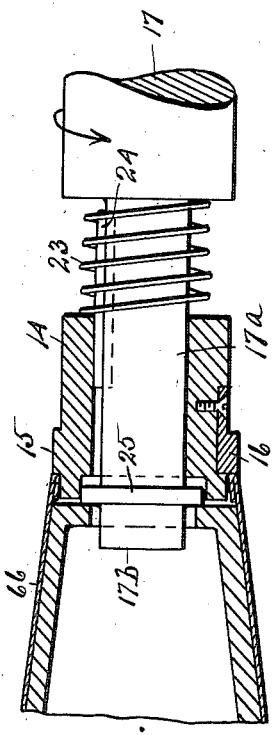
Fig. 15.
Fig. 16.
Witnesses
O. B. Baenziger
C. C. Jennings
Inventor
James A. Sanford
By Parker & Burton
Attorneys

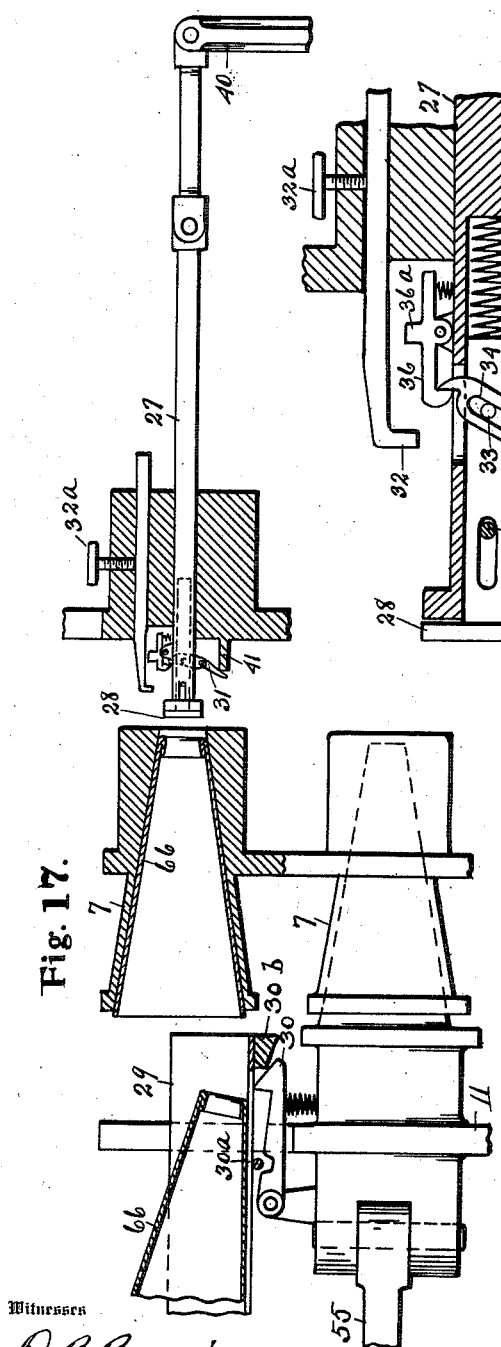
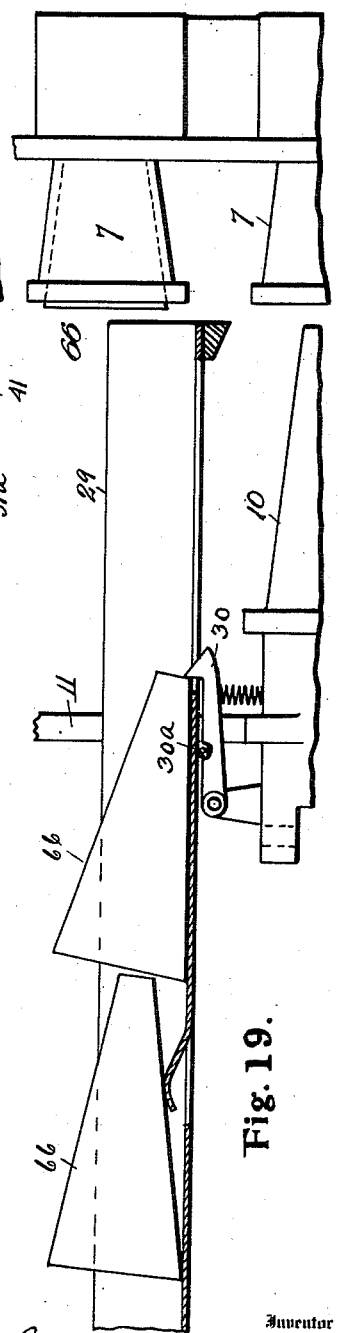

UNITED STATES PATENT OFFICE.

JAMES A. SANFORD, OF JACKSON, MICHIGAN.

BOTTLE-MACHINE.

1,019,533.

Specification of Letters Patent. Patented Mar. 5, 1912.

Application filed October 10, 1910. Serial No. 586,186.

*To all whom it may concern:*

Be it known that I, JAMES A. SANFORD, a citizen of the United States, residing at Jackson, county of Jackson, State of Michigan, have invented a certain new and useful Improvement in Bottle-Machines, and declare the following to be a full, clear, and exact description of the same, such as will enable others skilled in the art to which it pertains to make and use the same, reference being had to the accompanying drawings, which form a part of this specification.

This invention relates to a machine for making conical paper bottles. The machine in which this invention is embodied does not complete the vessel but only makes a cone from a sheet of paper cut to the proper shape and doubles in the edge of the small end of the cone, after which the partially completed bottle is transferred to other machines which carry the construction further.

In the drawings:—Figure 1, is a side elevation of the machine. Fig. 2, is an end elevation. Fig. 3, is a plan view of a part of the device with the sliding head back. Fig. 4, shows the vessel completed, so far as this machine completes it. Fig. 5, is a detail of an air valve shown at 68 on Fig. 1. Fig. 6, is a section of the vessel in its completed condition, that is, completed so far as this machine completes it. Fig. 7, is a side elevation of an attachment at the top of a machine used for the preliminary shaping of the package, along the line X—X of Fig. 8. Fig. 8, is an end elevation of the same part shown in Fig. 7, along the line Y—Y thereof. Fig. 9, is a detail of one of the plungers shown in Fig. 7. Fig. 10, is a detail of the driving mechanism which actuates the turret. Fig. 11, shows the track which holds the sliding die head. Fig. 12, shows a strengthening rod used in connection with the tie rod and axis 58. Fig. 13, is a sectional detail of the edge turning mechanism. Fig. 14, is a sectional detail enlarged somewhat and showing some of the same parts as are shown in Fig. 13, but differently positioned. Fig. 15, shows the same parts in a different position. Fig. 16, is the coupling between the rotary plunger 17 and the links by which it is driven. Fig. 17, is a sectional detail of the expelling plunger. Fig. 18, is a detail on an enlarged scale of some of the parts shown in Fig. 17. Fig. 19, is a detail on an enlarged scale of other parts shown in Fig. 17.

The mechanism of the entire machine is driven from the shaft A, to which motion is communicated from any satisfactory source of motion; from the shaft the main driving movements are communicated through a pinion which meshes with a large gear wheel B on a shaft 45 located near the bottom and at the rear of the machine. (That part of the machine is considered the front of the machine at which the platform P is located.)

The operator stands on the platform and feeds the machine across the table 1. Horizontal cross and counter shafts carry the motion from the shaft 45 through miter gears 46, miter gears 47, horizontal cross shaft C, horizontal counter shaft D, miter gears 48 and vertical shaft E, miter gears on the shaft 45 on the end opposite to the miter gear 46 and the vertical shaft F carrying the movement to the principal moving parts; subordinate moving parts are actuated by cams and belt wheels properly located on these shafts, especially on the shafts 45, A, C, and D.

The paper treated with glue along one edge 66ª, is withdrawn from a conveniently located storage receptacle and passed beneath a folder which wraps the paper around a die; the die advances into a hollow die, carrying the paper with it and presses the paper into the hollow die with considerable force squeezing out all superfluous glue and producing a very close, tight joint. During the advance movement, from the time the blank is folded around the die, the paper is held to the die by air suction or the pressure of air on the outside acting against the partial vacuum produced by drawing air from the inside. After the paper has been forced into the hollow die the suction action ceases, and is followed by a blast action through the same air pipe. The plunger die is withdrawn, leaving the formed blank in the hollow die; the turret head revolves on the center around which it turns, eventually bringing the hollow die into position for an edge turning tool to act, which enters the hollow die from the end opposite that at which the blank was forced into the hollow die; an anvil die or holding die enters the hollow die and the formed blank is held in place while the edge at the small end is turned in against the walls of the bottle; after this is completed, the anvil withdraws, the hollow die advances, and an expelling die enters the small end of the hollow die and expels the blank from the hollow die, dropping it into a trough along which it travels to the tail end of the machine.

The mechanism through which this is accomplished, described at length, is as follows:—The cutting of the blank is preparatory to the use of the blank with this machine, the pasting of it or the gluing of it is accomplished at the tank V by pushing the blank manually under the coating wheel 84ª which is driven by a belt 85ᶜ from belt wheel 86 on the shaft C. The glue coating appliance, while an adjunct to the machine, forms, as to structural details no part of the invention, and need not be described. The coated blank is moved manually across the table 1 onto a plate 65; this plate 65 is a reciprocating sheet metal table or thin tablet located on the stem of the die 3; the die 3 reciprocates, driven by mechanism that will be described later, and in its backward reciprocation draws the thin plate 65 from under the blank which is held against travel, in this direction, with the table by fingers 8 that hang from the frame 60; the lower ends of these fingers 8 project into grooves 65ª in the plate 65 below the lower surface of the blank 66. The frame 60 rises above the main frame-work of the machine and is braced by a gooseneck brace 61 from the main part of the machine on the rear side thereof, and rises directly from the supports of the table 1 at the front of the machine. Its upright axis is inclined from the vertical, and it carries and guides a second frame which reciprocates on the inclined axis; this second frame 62 is normally held in its most elevated position by springs 64 that surround posts that rise from the reciprocating frame 62. The reciprocating frame carries plungers 4 normally lifted by springs 4ª, and positively forced downward by a lever 78 ultimately driven by a cam on the shaft 45, and driven through an interposed rock lever 79 and a link 78ª. When the frame 62 is drawn downward by the lever 78, it brings the rod 4, which may be considered as a presser foot or as presser feet, for there are two of them, against the blank 66, and pushes the blank 66 against the die 3, the frame 62 continues its downward motion, being forced downward by the arm 78. A system of toggle links pivoted to the frame 62 and to the presser foot 4 actuate a three part folding frame, 2, 2ª and 2ᵇ, of which the central part 2 of about 120 degrees arc is fixed to the plate 63, which forms the base of the frame 62; the parts 2ª and 2ᵇ each of which comprise about 120 degrees are hinged to the part 2 at its edges and are connected by toggle links to the frame and to the presser feet. One of the links 6ª is longer than its companion link 5, and is actuated by a link 6 in the system of toggles which is longer than the companion link 5ª of the companion system. The part 2ᵇ consequently moves slower than the part 2ª, and that part of the blank which is under the part 2ᵇ reaches its final position against the die 3 after that part of the blank which is under the part 2ª. The link 6ª is made extensible, as is shown in Fig. 9, by making it in two parts, one of which is tubular and contains a spring against which the other part presses, and this insures the certainty of folding that edge of the blank which is under the wing 2ª under that edge of the blank which is under the wing 2ᵇ, and always brings the glued surfaces together; generally, the glued surface is along that edge of the blank which is under the wing 2ª, and thus the glued surface lies to the outside of the die 3 on the partially folded blank before the edge under the wing 2ᵇ comes into intimate connection with it. The blank folded around the die 3 now advances with the die into the matrix die; the advance of the die is effected by means of the toggle levers, shown in detail in Fig. 3, in which the die 3 is shown as projecting from a reciprocating head 11 that travels on tie rod 58, which rod forms the axis of the head 11, and also the axis upon which the matrix dies 7 revolve. The head 11 is held to a fixed head 57 by toggle levers 55 and 56 and these toggle levers 55 and 56 are actuated by crank arms 53 and 54 from the cranks 51 and 52 upon disks 49 and 50 at the head of the shafts E and F, which are driven, as has been heretofore stated, ultimately by the shaft A and more directly by the interposed shafts and gearing that has been heretofore described.

The toggle system affords an extremely strong pressure of the die 3 and the matrix die 7; the connection between the links 54 and 53 with the toggle links is made with lost motion joints which produce an intermitting action of the toggle levers and an intermitting reciprocating of the head 11 from a constantly rotating motion of the crank pins 51 and 52. Shock is obviated by air dash pots 59 which connect the toggle joints and the head 57. During the advance of the die 3, the air is drawn out therefrom by air suction through pipe 67 through the valve 68ª in the casing 68, which valve is a four-way valve arranged to convert suction into blast by turning the valve in the casing 90 degrees. The pipes 69 and 70 are in circuit with an air compressor the valve in case 68 being turned by levers 86 actuated ultimately by a cam on the cross shaft K. The lever 86 which actuates the link 71 is pivoted to the frame, and is lifted by the cam on the cross shaft K, lifting the link 71 and turning the valve 68ª in the casing.

Suction action is maintained during the folding of the blank around the die 3, during the advance of the die 3, and until the final pressure action of the die 3 against the matrix die 7, blast action forces the blank from the die before the retreat of the die 3; the turret head containing a number of dies 7 is revolved until the die 7 containing the blank which has just been treated reaches the end turning location. The end of the now partially finished bottle is turned in so as to double the end in on the body of the bottle at the small end of the bottle, and this is done by a plunger actuated by the lever 18, shown in Fig. 2. The lever 18 is actuated by a cam on the shaft C which turns against an anti-friction wheel 18$^a$ at the bottom of the lever 18; the upper end of the lever 18 is linked to a plunger shown in Fig. 13. The plunger reciprocates and the main body 17 of it rotates on its longitudinal axis, being joined by coupling 80 to the link 81, which coupling 80 is provided with trunnion pins 82 to which the link connects, and it contains the end of the headed shaft 17. The shaft 17 is provided with a spline and slides through a pulley 20 driven from a pulley wheel on the shaft A; the pulley rotates the shaft 17. The pulley 20 is held from undesired movement lengthwise of its axis, which might otherwise be caused by the friction of the shaft 17, which passes therethrough, by the overreaching bracket arm 22. The shaft 17 carries at its forward end a head that enters the matrix die 7 at the small end thereof, and a centering projection 17$^b$ on the head enters a centering hole in the anvil die or holder 10 that advances into the die from the large end thereof simultaneously with the entrance of the die 3 into a newly forming bottle.

The die 10 does not reach to the extreme end of the blank, leaving a projecting part 66$^b$ of the blank 66 to be turned in against itself. The head 14 at the end of the shaft 17 is provided with the centering projection 17$^b$ with a collar, 15 upon which there is a turning finger 16, the front edge of which is slightly inclined to the line of the collar 15 and projects at the side thereof, and is slightly undercut or curved along that face which contacts the edge of the bottle blank 66, and when rotated and at the same time pressed against the edge, turns the edge in on itself until the bottle end finally assumes the form shown in Fig. 15.

The head 14 is held out toward the end of the neck 17$^a$ of the shaft 17 by a spring 23 which presses the head against the limiting collar 25. A feather 24 compels the head to turn with the shaft; after the edge has been turned, the anvil die 10 and the plunger 17 both withdraw; the turret head advances a step, and an expelling plunger 27 enters the small end of the matrix die and expels the bottle from the die onto the trough 29; the expelling head is actuated by a lever 40 which is oscillated by a cam on the shaft C, and is provided at its expelling end with a projectile head 28 held in a cavity in the shaft 27 against a spring 35, and arranged to be automatically projected by the force of the spring and retracted into the cavity by the retreating action of the plunger 27. A pin 38 passed through the walls of the plunger 27 and through an elliptical opening in the head 28 limits the outward movement of the head 28; a pin 33 engaging through a trigger 31 that is pivoted to a hanger from the walls of the plunger 27 retracts the head into its cavity when the tail 31$^a$ of the trigger 31 engages a projection 41 on the frame, through which the plunger 27 reciprocates. The top end of the trigger 31 is caught under a hook 36 that is disengaged from the trigger when the plunger 27 has advanced to bring the angle arm 36$^a$ of the hook against a hanger 32 on the frame; the hanger 32 is adjustable by means of adjusting screws 32$^a$. The engagement between the angle arm 36$^a$ and the hanger 32 acts substantially at the end of the forward movement of the plunger 27, and this engagement is immediately forced by the sudden projection of the head 28 which gives to the already loosened bottle a projectile force that throws the bottle clear from the matrix 7 onto the trough 29 and in front of a hook 30 carried by the die 10. This hook 30 is pivoted and is lifted against a stop 30$^a$, and at the close of the forward movement of the die 10 the head end of the hook 30 is forced downward by engaging against the part of the frame or the hanger 30$^b$ hanging from the trough 29. The bill of the hook lifts as soon as the plunger 10 retreats sufficiently to allow it to do so, engages through a slot in the bottom of the trough 29, engages the bottle in the trough and carries it and any bottle which may be in front of it forward toward the delivery end of the machine.

The hollow die members are in a turret head carried on the shaft 58. This turret is revolved by a system of actuating pawls shown in detail in Fig. 10, which supplements Fig. 2 on which the main actuating lever 84 and its pawl 84$^c$ is shown. This is connected by link 85 to a bracket on the frame, and is actuated by cam 87 on the shaft D. The pawl 84$^c$ makes a long actuating throw and the turret is held and accurately located by the two holding pawls 88 and 89 shown in Fig. 10; both of these pawls engage somewhat loosely in the notches in the driving rim 90 of the turret, and to compensate for the loose engagement the pawl 89 is arranged to have a backward thrust.

The pawl 88 simply engages in the notch 91, in which it is held by a spring 92. At times when the tension of spring 93 does not overcome the tension of the spring 92, the spring 93 engages a lever 94 which is linked to the link 95 and this in turn actuates the pawl 88 which is held to it by a loose pin connection. The lever 94 is lowered by the turn of the cam 74 so that its low part is at the top during the time that it is desired that the turret shall remain quiet, since by its lowering the pawl 88 is forced upwardly into the notch in the turret due to the movement of the link 94$^a$ and of the pivoted lever 94$^b$ under the downward pull of the lever 94; when the cam 74 revolves to present the high part thereof under the arm 94, the link 94$^a$ is thereby caused to rise and push upwardly the opposite end of the lever 94$^b$ from that to which the pawl 88 is connected, thus forcing the pawl 88 downwardly against the resiliency of the spring 92, and causes its disengagement from the notch contemporaneously with the release of the pawl 89 from engagement with the notch 96; the turret is then free to revolve and does revolve on its axis.

During the period of disengagement of the pawl 88 with the turret, the pawl 89 which has a head yieldingly projected by the spring 75 is also disengaged from the notch 96 by the interaction of its driving lever 97 and the cam 76. The spring-projected head 89 coacts with the pawl 88, the one being fixed in position and the other under spring tension to give to the turret head a backward torque which holds it properly centered. The sliding head 11 is provided with a notch on its under side which engages on a track 99 which holds it from turning.

As an additional safety means to prevent the closing in of the head 57 against the bearing or block 101 through which the shaft 58 extends, a rod 102 is placed between the head 57 and the block 101, the main purpose of this being to prevent the bearing 58 from being drawn out of its holding connection with the head 57.

What I claim is:—

1. In a paper bottle forming machine, in combination with a series of matrix dies rotatable about a common center, means for periodically actuating said dies, a longitudinally reciprocative plunger die, means for actuating the same lengthwise of its axis into one of the matrix dies, a folder member adapted to periodically fold a previously deposited blank about said plunger die at the beginning of each forward movement, means for exhausting the air from the interior of said plunger die after the blank has been wrapped thereabout, whereby it is held in place during the forward movement of the plunger die, and for forcing air thereinto at the end of such forward movement, thereby driving the blank from further engagement thereabout, and means adapted to act complementarily to the other portions of the mechanism for successively forcing from each matrix die a formed blank previously deposited therein, substantially as described.

2. In a paper bottle forming machine, in combination with a plunger die, means for positively actuating said plunger die in either direction along its axis, means for gumming the edge of a prepared blank before its treatment by the parts of the mechanism, a folder for wrapping said blank around said plunger die with its edges overlapping at the beginning of each forward movement thereof, a suction pipe leading into the interior of said plunger die, whereby air may be exhaused therefrom when the blank is first wrapped therearound, and whereby air under pressure may be forced thereinto when the subsequent separation of the plunger die from the blank is desired, and interconnecting members between the parts whereby the termination of the exhaust action and the beginning of the blast action through said pipe is made to conform to the position of the plunger die in the cycle of operations, substantially as described.

3. In a paper bottle forming machine, the combination of means for coating a selected edge of each blank fed thereto with an adhesive substance when the blank is withdrawn from an adjacent place of storage, a longitudinally reciprocative plunger die provided with air perforations through the working surface thereof, an air duct communicating with the interior and perforated portion thereof, means actuated by the movement of other portions of the mechanism for alternatingly producing suction and pressure action therethrough contemporaneously with the beginning of the forward and of the retractive movement respectively of the plunger die, a folder member movable transversely of the axis of said plunger die and adapted to automatically wrap a blank therearound with the gummed edge overlapping an ungummed portion, at the beginning of each forward movement, a matrix die into which the plunger die forces the blank at the end of its forward movement, and an expelling member working synchronously with the beginning of the rearward movement of said plunger die, and from the opposite side of the matrix die from that on which said plunger die is located, whereby the formed article is expelled from the matrix die, substantially as described.

4. In a paper bottle forming machine, in combination with a matrix die, an anvil plunger adapted to engage in said matrix die, a coöperating folding member adapted to successively engage individual prepared blanks and to fold the same about said anvil plunger, an edge turning tool adapted to engage in said matrix die and to rotate therein, and means adapted to act on the formed article after the operation of said edge turning tool, whereby the article is expelled from the matrix die, substantially as described.

5. In a paper bottle forming machine, in combination with a matrix die, an expelling plunger adapted to loosen the bottle formed in said matrix die, and a projectile head to said expelling plunger adapted to complete the expulsion of said paper bottle, substantially as described.

6. In a paper bottle forming machine, in combination with a supporting frame, a folding member comprising a curved central portion carried by said frame and curved wing portions hinged to each lateral edge of said central portion, a central pressure rod capable of longitudinal movement with said supporting frame, spring members for yieldingly holding said parts in raised and open position, link members connecting said rod with each of said wing portions, whereby the lengthwise movement of said rod causes the swing of said wing members to an unequal degree with respect to said central member, a longitudinally movable mandrel about which the folding of the wing members is thereby accomplished at the beginning of each forward movement thereof, and means for communicating actuation to the mandrel and to the folding member in desired sequence, substantially as described.

7. In combination with a conical matrix die open at both ends, a rotary head axially in line therewith, and adapted to be moved lengthwise into and out of engagement with a partially formed blank held within said matrix die, a turning finger having an inclined engaging face, carried by said head, whereby the edges of the small end of said blank are turned in, and a primarily inactive member arranged to move against and expel the formed article after the several forming members have completed their cycle of operation, substantially as described.

8. In a paper bottle forming machine, a means for turning an edge of the bottle in against the side walls thereof, comprising a matrix die and a complementary entering member, a reciprocating plunger axially in line with said matrix die and provided with a rotary head, and a turning finger attached to said head, the said head being resiliently connected to the plunger, substantially as described.

9. In a paper bottle forming machine, in combination with a supporting shaft, a matrix die member, a reciprocatory plunger die member slidably arranged with respect to said shaft, a reciprocating actuator member, a knuckle lever for communicating such actuation to said reciprocatory die, and a loose joint connection between said parts, whereby the lever remains stationary during a part of the movement of the actuator, substantially as described.

In testimony whereof, I sign this specification in the presence of two witnesses.

JAMES A. SANFORD.

Witnesses:
   CHARLES F. BURTON,
   LOTTA LEE BRAY.